(12) United States Patent
Anjur

(10) Patent No.: US 7,324,991 B1
(45) Date of Patent: Jan. 29, 2008

(54) SAMPLING IN A MULTIDIMENSIONAL DATABASE

(75) Inventor: Vijayakumar Anjur, Sunnyvale, CA (US)

(73) Assignee: Hyperion Solutions Corporation, Santa Clara, CA (US)

( * ) Notice: Subject to any disclaimer, the term of this patent is extended or adjusted under 35 U.S.C. 154(b) by 462 days.

(21) Appl. No.: 10/233,053

(22) Filed: Aug. 30, 2002

(51) Int. Cl.
*G06F 7/00* (2006.01)
*G06F 17/30* (2006.01)

(52) U.S. Cl. .................................. 707/5; 707/3; 707/4

(58) Field of Classification Search ................. None
See application file for complete search history.

(56) References Cited

U.S. PATENT DOCUMENTS

| 5,675,786 | A | * | 10/1997 | McKee et al. ........... 707/103 R |
| 5,878,426 | A | * | 3/1999 | Plasek et al. ............... 707/102 |
| 6,003,036 | A | * | 12/1999 | Martin ...................... 707/102 |
| 6,094,651 | A | * | 7/2000 | Agrawal et al. ............... 707/5 |
| 6,446,063 | B1 | * | 9/2002 | Chen et al. ................... 707/4 |
| 6,842,753 | B2 | * | 1/2005 | Chaudhuri et al. ........... 707/10 |
| 6,912,524 | B2 | * | 6/2005 | Acharya et al. ............... 707/3 |
| 2003/0018615 | A1 | * | 1/2003 | Chaudhuri et al. ............ 707/1 |

\* cited by examiner

*Primary Examiner*—Charles Rones
*Assistant Examiner*—Jacob F. Betit
(74) *Attorney, Agent, or Firm*—Hickman Palermo Truong & Becker LLP

(57) ABSTRACT

Sampling may be supported in a multidimensional database by integrating it into metadata and/or data navigation requests. Additionally, biasing may be introduced to allow a user to focus results.

22 Claims, 10 Drawing Sheets

SAMPLING IN A MULTIDIMENSIONAL DATABASE

FIELD OF THE INVENTION

The present invention relates to the field of multidimensional databases. More specifically, the present invention relates to sampling data in a multidimensional database.

BACKGROUND OF THE INVENTION

Database applications are commonly used to store large amounts of data. One branch of database applications that is growing in popularity is Online Analytical Processing (OLAP) applications. This typically involves designing databases for fast access. Using specialized indexing techniques, it processes queries that may pertain to large amounts of data and multidimensional databases much faster than traditional techniques.

Typically, a multidimensional database stores and organizes data in a way that better reflects how a user would want to view the data than is possible in a two-dimensional spreadsheet or relational database file. Multidimensional databases are generally better suited to handle applications with large volumes of numeric data and that require calculations on numeric data, such as business analysis and forecasting, although they are not limited to such applications.

A dimension within multidimensional data is typically a basic categorical definition of data. Other dimensions in the database allow a user to analyze a large volume of data from many different viewpoints or perspectives. Thus, a dimension can also be described as a perspective or view of a specific dataset. A different view of the same data is referred to as an alternative dimension.

There are typically two types of data stored in a mutidimensional database. The first type of data includes measures. These measures are typically purely quantitative values and, taking an example of a supermarket chain, may cover such things as sales, profit, expenses, inventory, etc. The second type of data includes properties. Each measure typically has several properties associated with it. For example, location, month, product types are all properties that may be associated with sales. Thus, a user may wish to view all sales in the month of July. Or may want to view all sales of produce in the month of June in California.

Additionally, each of the dimensions may have a hierarchy to it that more accurately groups the data. For example, there are 365 days in a year, but while sales data may be updated daily and thus may contain different entries for each day of the year, it is unlikely that a user would want to view sales data for a particular day as most users are looking for trends. Thus, a "time" attributes containing 365 days may actually be hierarchically grouped into larger sets, such as weeks, months, years, etc. Likewise a product hierarchy may be grouped into dairy, produce, meats, etc. This allows a user to search first based on broad groupings, then narrow in and focus the search on more granularized data. For example, the user may first find that sales of produce were down for the previous year. He then may search based on month and narrow it to October being a particularly bad month. He may then search further down in the produce grouping and find that apple sales were poor that month.

The problem with this type of multidimensional searching is that it requires a great deal of processing power when getting down to the lower levels of the hierarchy, and accordingly can be slow. The processing power must be spent organizing and reorganizing the data each time a search is performed. While the hierarchical categories can be set up as a predictor of likely reports groupings and thus speed the process at higher levels, at lower levels it is difficult to predict what data the user may request and thus response times can be fairly slow.

BRIEF DESCRIPTION

Sampling may be supported in a multidimensional database by integrating it into metadata and/or data navigation requests. Additionally, biasing may be introduced to allow a user to focus results.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION

Figure 1:
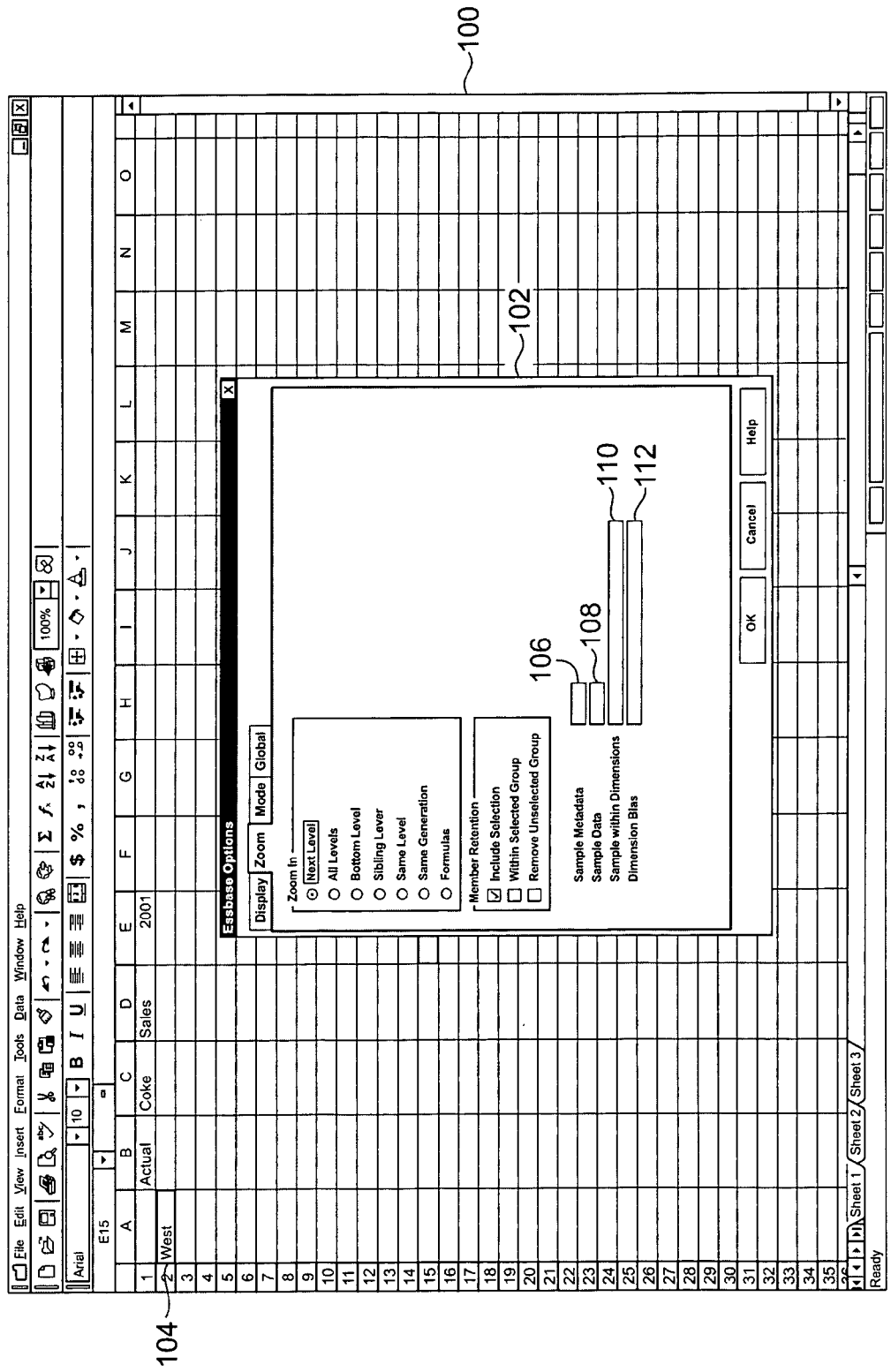
FIG. 1 is a diagram illustrating a screen capture of a user-interface used to implement sampling in accordance with a specific embodiment of the present invention.

Embodiments of the present invention are described herein in the context of a system of computers, servers, and software. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with the present invention, the components, process steps, and/or data structures may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

Sampling may be introduced in a multidimensional database. This allows the multidimensional database to be searched in a more efficient manner.

The proliferation of OLAP for relational database (called ROLAP) and other data mining tools operating on top of relational databases and the need for speed-of-thought query response times has caused some relational vendors to implement Structured Query Language (SQL) extensions to support sampling. Specifically, a query may be executed on a sample of rows instead of an entire table using a SAMPLE clause at the end of the query that identifies the size of the result set in relation to the table(s) involved. Some vendors merely apply sampling to the result set of a query, while others have tried to further optimize it by pushing the sampling to intermediate operations within the query such as selection, joins, and group-bys.

In a specific embodiment of the present invention, a multidimensional cube can be implemented in a relational database using a set of dimension tables that models dimensional hierarchies and a fact table that captures cell values, typically at the lowest levels of the dimensional intersections. Access to the multidimensional database may be made using a spreadsheet, a report-writer, or with calculator functions, for example. However, the relational engine does not have any notion of hierarchies or dimensions. Thus, the values in each dimension table's rows and columns are merely values and the fact that there exists hierarchical relationships between the rows or column values is known only at the SQL application level. For this reason, the sampling constructs available in SQL cannot simple be applied at the application level to capture the concepts of multidimensional database, nor is there any teaching or suggestion in the prior art to even apply sampling to multidimensional databases.

For example, in order to obtain a 10% sample of product-sales figures within each market time combination, a SQL application would have to first partition the table based on the (market, time) combination. Then, one SQL query per partition requesting a 10% sample would need to be issued. This can be quite time consuming. Additionally, other multidimensional concepts such as factoring in unavailable data (also known as data sparsity) at certain dimensional intersections are simply impossible in SQL.

In a specific embodiment of the present invention, sampling may be integrated into a multidimensional database during metadata and/or data navigation. Multidimensional data sets have a clear distinction between metadata and data. Metadata typically constitutes a set of dimensions, hierarchies within the dimensions, dimension members and one or more formulas attached to the members. Data is typically cell values at the intersection of members, one from each dimension in the dimension set.

Both the spreadsheet and report-writer mechanisms for accessing the multidimensional database may allow navigation of hierarchies along dimensions. An options menu on the spreadsheet may determine levels that are involved during a drill-down operation. The report writer may have several commands such as <CHILDREN, <DESCENDANTS, <ANCESTORS, etc. that can be used to define the sub-cube being queried. In a specific embodiment of the present invention, an option <MDSAMPLE operator can be introduced in the report writer to support metadata sampling. The syntax of this command could be:

<MD SAMPLE <percentage>/<absolute value>

Thus, the syntax picks a sample of members that satisfies a condition. The sample may be determined without taking into account data distribution. For example, suppose a sample of size 10% is requested of the number of children of West along the market dimension be used to retrieve cell values for actual sales of Coke. Thus, if there are 100 cities in the West region, a 10% sample would randomly pick 10 cities and return the actual sales of Coke for those 10 cities. This would be entered as follows:

<MDSAMPLE 10%<

CHILDREN West

<MDSAMPLE 0

Coke

Sales

2001

Actual

!

In the spreadsheet interface, an MDSAMPLE option that takes as input a percentage may be provided that applies to the drill-down operation being performed. Note the above example focuses only on sampling one dimension. Next consider a query requesting a 5% sample of actual sales of Coke in cities in the West for all sales in 2001. The corresponding query would be entered as:

<MDSAMPLE 10%

<CHILDREN West

<CHILDREN 2001

<MDSAMPLE 0

Coke

Sales

Actual

!

The simplest way of executing the query is then to create the cross product of all cities in the West with all days in 2001 and then pick a 10% sample of the cross product.

However, typically an analyst will have a preference as to how the sample should be taken. For example, the analyst may be attempting to decide in which stores the chain should stop selling Coke. He then would care more about having actual results having a fairly good random distribution over many stores as opposed to having the distribution being more biased towards the days in which products were sold. Thus, the sample would be chosen first from the cities and then for that sample, days are picked. This allows the system to split the 10% sample over multiple dimensions.

In a specific embodiment of the present invention, a bias number is assigned to each dimension, the bias number being between 0 and 100. If no bias is specified, then the straightforward approach of determining a sample from the cross product may be utilized. If, however, a bias is specified, it should be specified for all dimensions along which sampling is requested. Thus, in the above example, if the user wishes to biases along markets, the query could be rewritten as:

<MDSAMPLE 10%

<MDSAMPLEBIAS (Market 90, Time 10)

<CHILDREN West

<CHILDREN 2001

Coke

Sales

Actual

!

Thus, suppose there are 100 cities in the West region and 365 days in 2001. There are two ways of handling this biasing information. In the first, the bias is applied such that adequate members are chosen from the cross-product to wind up with exactly the percentage of members stated in the sample size. In the example above, this would mean the bias is applied in a manner such that 36,500 members are chosen and these members represent a 90% bias towards markets. In this solution all the bias numbers must equal 100.

The present application, however, will focus on the second way of handling the biasing information. In this solution, the bias numbers are applied individually to each dimension. Thus the <MDSAMPLE command would not be considered (or at least, is only executed to the set first derived from the biasing portion) under this solution and the bias numbers need not total to 100. In the example above, 90% of the cities are first taken, resulting in 90 cities being chosen. Then, 10% of the days are taken, resulting in 37 days (rounded up). The intersections of these selections are then identified. In the above example, this results in 3330 members (90 cities×37 days).

Once the portion of the cube that needs to be analyzed is determined by identifying a (sampled) subset of members from each dimension, a subset of cells then can be requested from this subcube by requesting a data sample. A data sample may be specified using a <DSAMPLE command in the report writer or by a Data Sample option in the spreadsheet extractor.

The syntax in the report writer may be:
<DSAMPLE <percentage>/<absolute-value>

The command may be applied to the subcube resulting after all the metadata methods are executed. However, the danger here is that many of the intersections may not have actual data entries. This is known as sparsity. For example, one city may have had a hurricane which shut down all stores in that city for several days. The intersection of those days with those stores would have no data. This problem can become more pronounced if other dimensions are used. Every product may not be sold in every store. In fact, typically multidimensional databases have only about a 2-3% density, thus a random sampling would result in a large amount of unusable data. Thus, there may be two different semantics of this command:

1) Sample the entire sub-cube regardless of sparsity and return the requested number of cells.
2) Sample only the existing cells in the subcube Another type of sampling which may be performed is dimensional sampling. Oftentimes a user is interested in analyzing data along a particular dimension or slice. For example, for each unique product/market combination, he may want to list actual sales for all time periods. Alternatively, for each valid product, he may wish to list sales for all markets for the first quarter. Sampling may be made available for these types of queries by slightly modifying the semantics of a DSAMPLE command. For example, consider the following report:

Actual

Sales

<DESC Time

<MDDIMSAMPLE (Product, Market) 5%

!

The above query returns a 5% sample of sales values for each unique (product, market) combination. It can also be extended to any number of dimensions.

FIG. 1 is a diagram illustrating a screen capture of a user-interface used to implement sampling in accordance with a specific embodiment of the present invention. The spreadsheet 100 may show the options 102 allowed to the user before requesting a zoom-in operation on one or more members selected on the spreadsheet. In the example, the user has elected to zoom-in on member West 104. As soon as the request is made a dialog box may appear requesting the user to specify what kind of zooming is requested—get the cities out of West (children) or Cities, Counties, and Zipcodes in West (descendants) or just Zipcodes in West (bottom level) and so on. In the example shown, "zoom in to next level", namely, cities in West, is requested.

Additionally, four extra menu items may appear. Sample Metadata 106, Sample Data 108, Sample unique within Dimensions 110, and Dimension Bias 112. However, typically sampling metadata cannot be selected along with dimensional biasing as they are mutually exclusive.

The first menu "Sample Metadata" 106 may be used to enter a number or a percentage indicating the sample size requested for the cities in West. Since in this example only one dimension is zoomed in, the last two menu item options are not meaningful. Alternatively, the user could have requested a data sample by entering a sample size.

Figure 2:
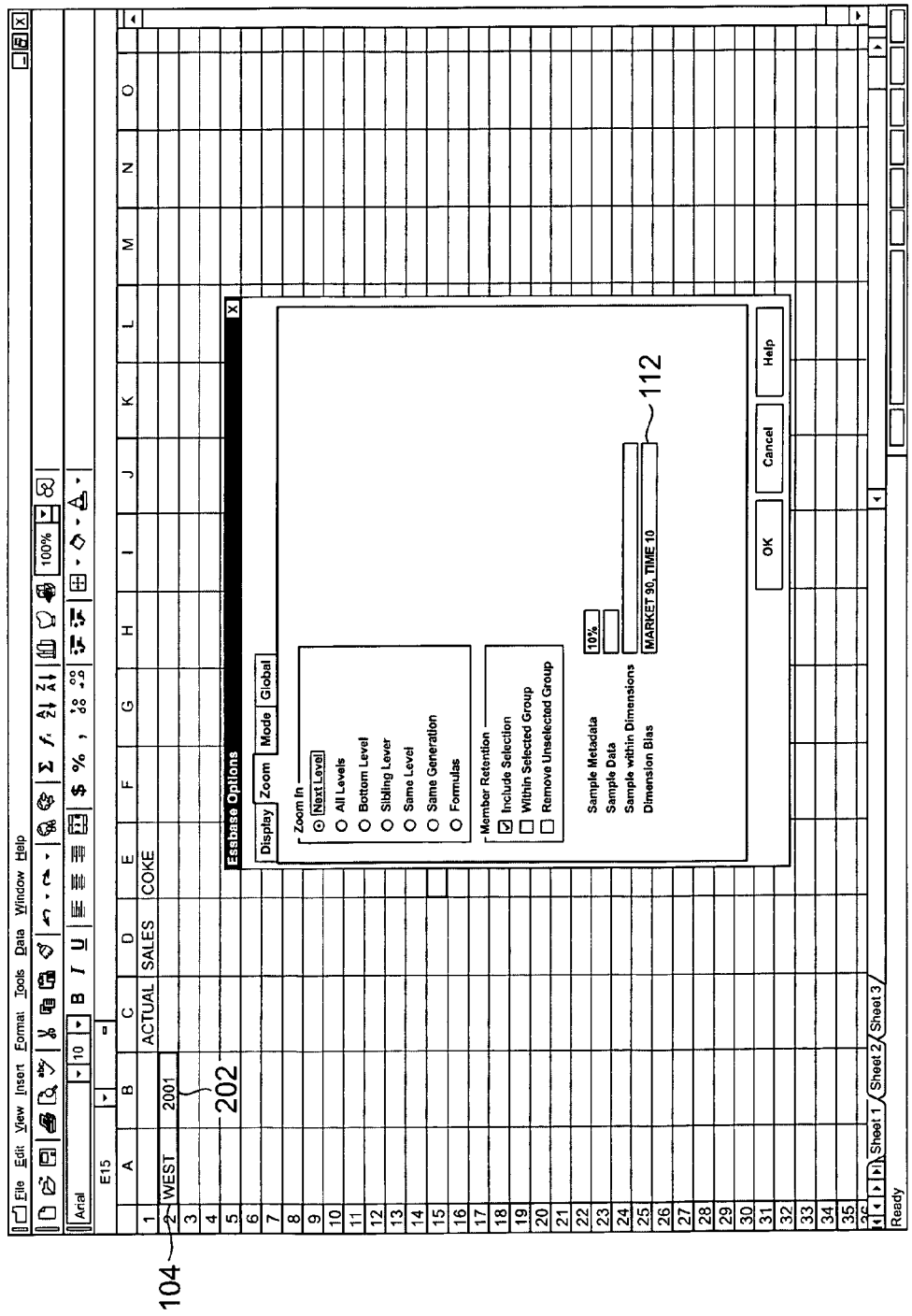
FIG. 2 is a diagram illustrating a screen capture of a user interface used to implement biasing in accordance with a specific embodiment of the present invention.

FIG. 2 is a diagram illustrating a screen capture of a user interface used to implement biasing in accordance with a specific embodiment of the present invention. The user may select a zoom-in operation on West 104 and 2001 202. In this case, the user has a choice of entering dimension bias if it is desired. The bias is indicated in the last menu option 112 requesting that a 10% sample be obtained such that the market is biased 90% and time 10%.

The sampling constructs may also be integrated into a calculator. Two new calculator functions, namely @DSAMPLE (percentage) and @MDSAMPLE (percentage) may be added to the current family of calculator functions with the following rules:

a) The functions may only be used within a formula similar to other calculator functions.

b) The functions have scoping rules. E.g., @SAMPLE (0) nullifies the effect of any prior @SAMPLE requests for subsequent statements in a formula.

c) @MDSAMPLE applies to all metadata functions and @DSAMPLE applies to all cell values considered within the formula. For example:

```
AvgSales    (@MDSAMPLE (10);
             @DSAMPLE (5);
             @AVGRANGE (Sales, @LEVMBRS (Products, 0));
```

The above formula requests that 10% of the level 0 members of the product dimension be sampled. Further, when determining the average sales across the 10% sample of products, consider only 5% of the cell values.

Such constructs may be used with formulas executed at query time (i.e., located on dynamically calculated members).

Additionally, sampling may be extended to Hybrid Analysis. In Hybrid Analysis, a multidimensional data set may be physically separated between a relational database and a multidimensional database. Data which may need to be accessed quickly may be placed in the multidimensional database, whereas all the rest of the data may be placed in the relational database. This can greatly improve the efficiency of searches. There are several approaches by which sampling may be integrated into Hybrid Analysis. The multidimensional database may simply extend a relational SAMPLE construct at the end of each metadata and data relational query issued to the relational database. Alternatively, sampling constructs could be interpreted and applied only when exploring the Hybrid portion of the multidimensional cube. Another approach may be to make available certain pre-determined sampling values for each dimension and fact tables. For instance, all queries are restricted to a sample 20% sample size based on size of the fact or dimension table.

FIGS. 3-10 describe various embodiments of the present invention. It should be noted that while these embodiments describe solutions that respond to sampling when given a first set of members and a second set of members (i.e., two dimensions), one of ordinary skill in the art will recognize that they could easily be applied to any number of dimensions by simply adding an input for each of the other dimensions and adjusting the cross product to include the other dimensions. As such, the embodiments should be interpreted to cover any number of dimensions, not just two.

Figure 3:
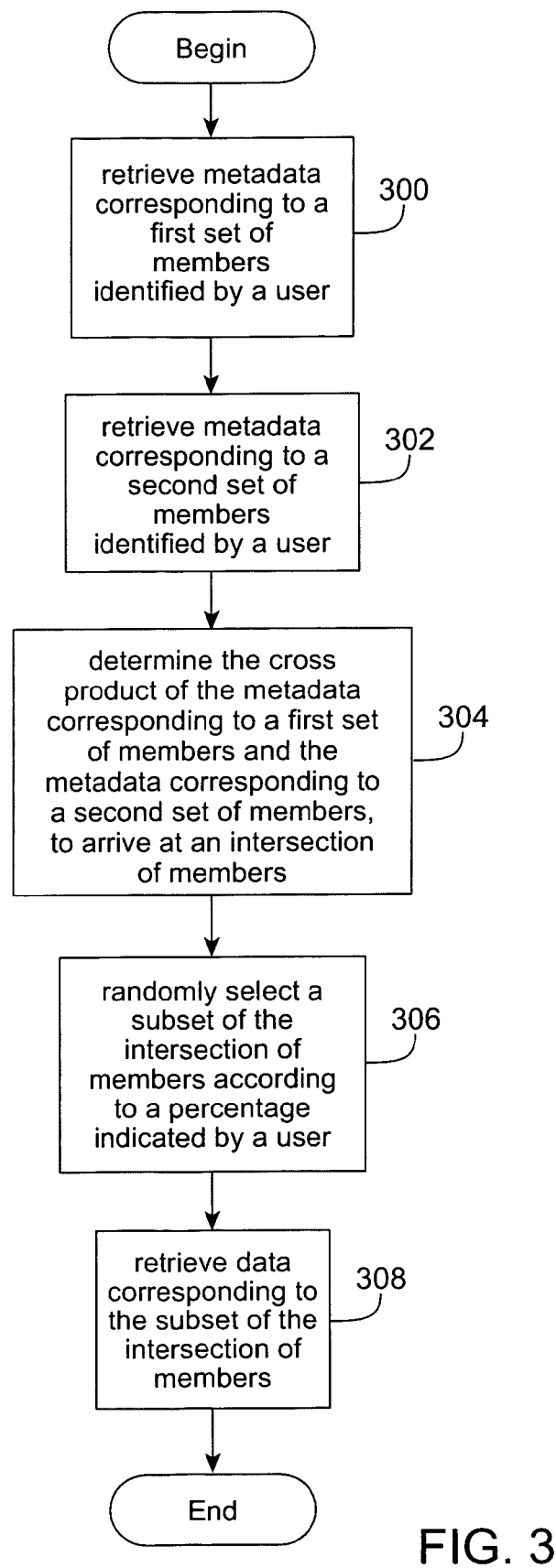
FIG. 3 is a flow diagram illustrating a method for sampling data in a multidimensional database, the multidimensional database having metadata and data, in accordance with a first embodiment of the present invention.

FIG. 3 is a flow diagram illustrating a method for sampling data in a multidimensional database, the multidimensional database having metadata and data, in accordance with a first embodiment of the present invention. The multidimensional database may be implemented in a relation portion using a set of dimension tables that models dimensional hierarchies and a fact table that captures values. At 300, metadata corresponding to a first set of members identified by a user is retrieved. At 302, metadata corresponding to a second set of members identified by a user is retrieved. The first and second set of members identified by a user may be identified by selecting elements in a spreadsheet corresponding to the metadata. At 304, the cross product of the metadata corresponding to a first set of members and the metadata corresponding to a second set of members is determined, to arrive at an intersection of members. At 306, a subset of the intersection of members is randomly selected according to a percentage indicated by a user. The percentage may be indicated by selecting an option in the spreadsheet. At 308, data corresponding to the subset of the intersection of members is retrieved.

Figure 4:
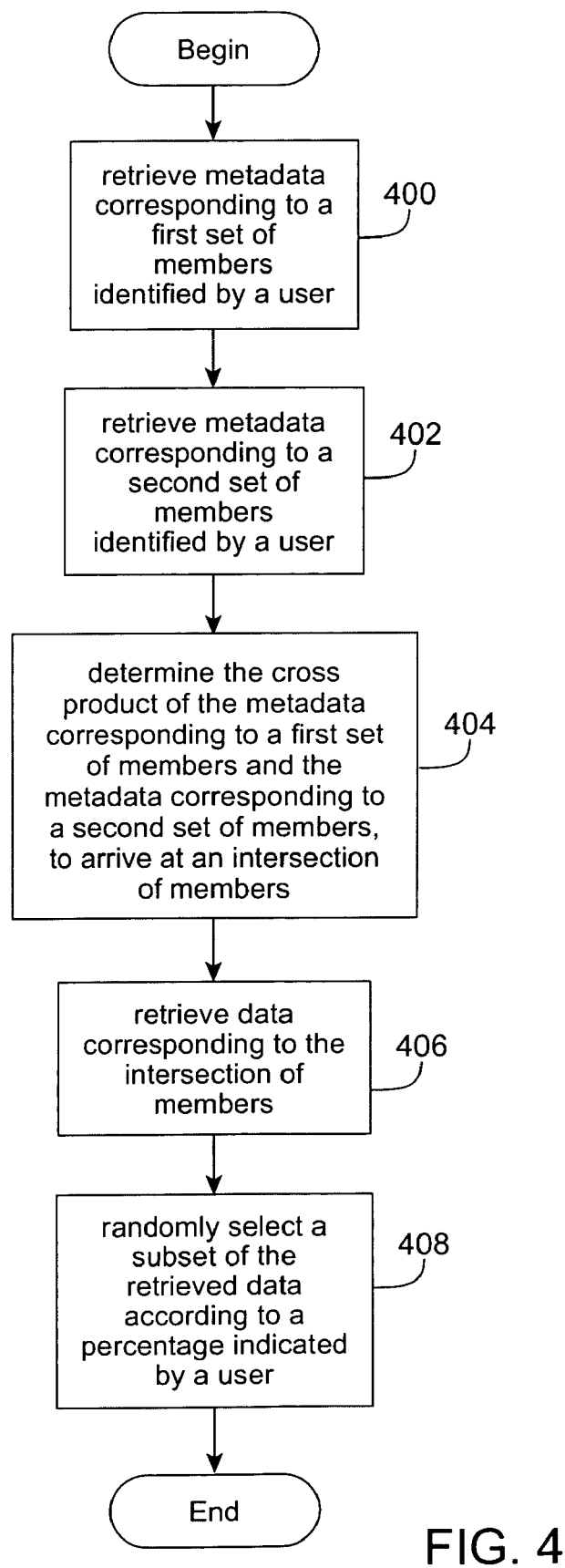
FIG. 4 is a flow diagram illustrating a method for sampling data in a multidimensional database, the multidimensional database having metadata and data, in accordance with a second embodiment of the present invention.

FIG. 4 is a flow diagram illustrating a method for sampling data in a multidimensional database, the multidimensional database having metadata and data, in accordance with a second embodiment of the present invention. The multidimensional database may be implemented in a relation portion using a set of dimension tables that models dimensional hierarchies and a fact table that captures values. At 400, metadata corresponding to a first set of members identified by a user is retrieved. At 402, metadata corresponding to a second set of members identified by a user is retrieved. The first and second set of members identified by a user may be identified by selecting elements in a spreadsheet corresponding to the metadata. At 404, the cross product of the metadata corresponding to a first set of members and the metadata corresponding to a second set of members is determined, to arrive at an intersection of members. At 406, data corresponding to the intersection of members may be retrieved. At 408, a subset of the retrieved data is randomly selected according to a percentage indicated by a user. The percentage may be indicated by selecting an option in the spreadsheet. This random selection may comprise randomly selecting a subset of the retrieved data according to a percentage indicated by a user by sampling only existing cells. This helps resolve any sparsity problems.

Figure 5:
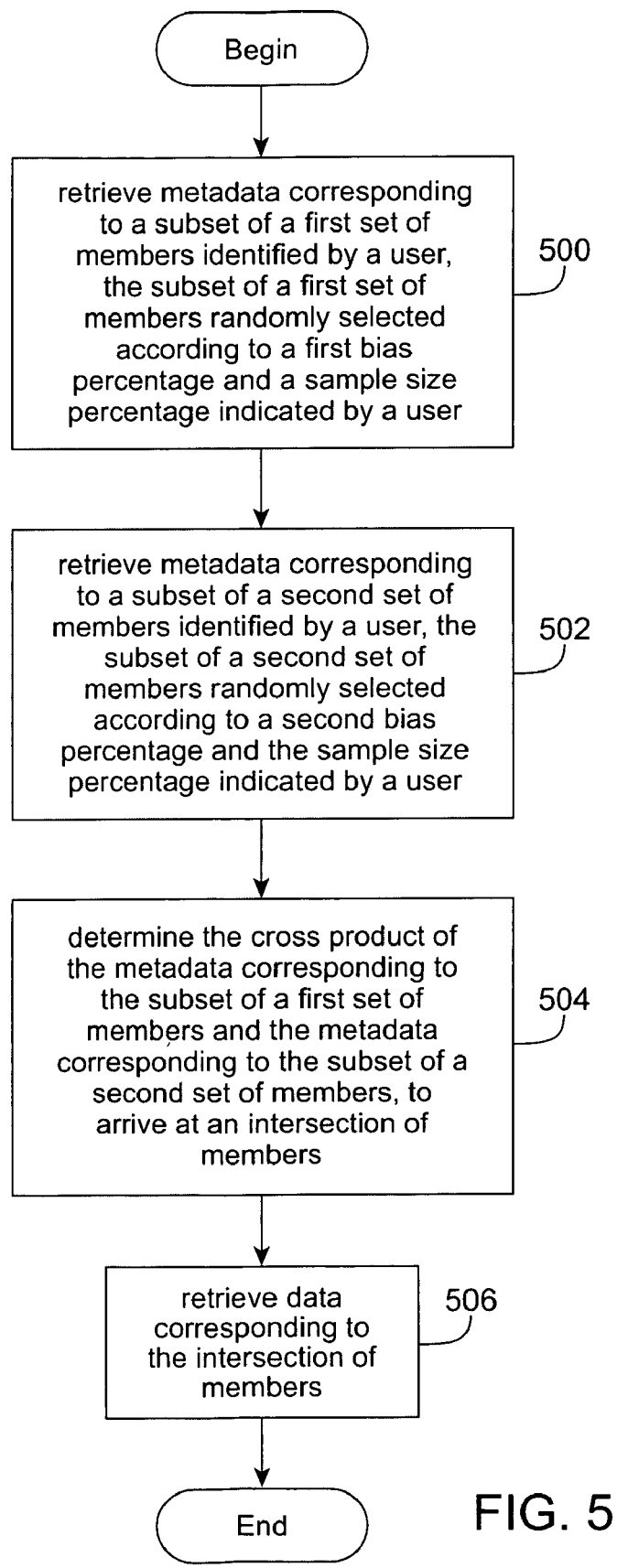
FIG. 5 is a flow diagram illustrating a method for sampling data in a multidimensional database, the multidimensional database having metadata and data, in accordance with a third embodiment of the present invention.

FIG. 5 is a flow diagram illustrating a method for sampling data in a multidimensional database, the multidimensional database having metadata and data, in accordance with a third embodiment of the present invention. The multidimensional database may be implemented in a relation portion using a set of dimension tables that models dimensional hierarchies and a fact table that captures values. At 500, metadata corresponding to a subset of a first set of members identified by a user is retrieved, the subset of a first set of members randomly selected according to a first bias percentage and a sample size percentage indicated by a user. At 502, metadata corresponding to a subset of a second set of members identified by a user is retrieved, the subset of a second set of members randomly selected according to a second bias percentage and a sample size percentage indicated by a user. The first and second set of members identified by a user may be identified by selecting elements in a spreadsheet corresponding to the metadata. The subset of a first set of members may be randomly selected in conjunction with the subset of a second set of members such that the cross product results in a number of members in the intersection of members equal to the sample size percentage of the cross product of metadata corresponding to the first set of members and metadata corresponding to the second set of members. At 504, the cross product of the metadata corresponding to the subset of a first set of members and the metadata corresponding to the subset of a second set of members is determined, to arrive at an intersection of members. At 506, data corresponding to the intersection of members may be retrieved.

Figure 6:
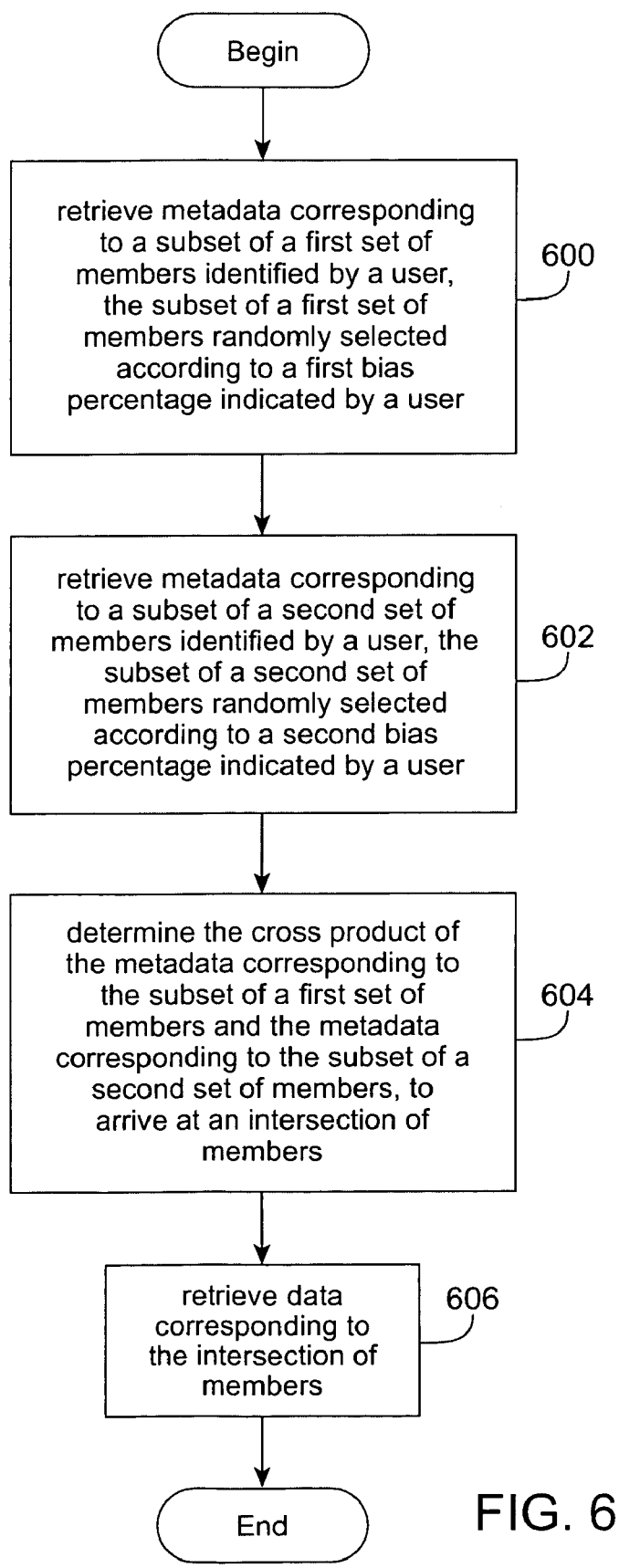
FIG. 6 is a flow diagram illustrating a method for sampling data in a multidimensional database, the multidimensional database having metadata and data, in accordance with a fourth embodiment of the present invention.

FIG. 6 is a flow diagram illustrating a method for sampling data in a multidimensional database, the multidimensional database having metadata and data, in accordance with a fourth embodiment of the present invention. The multidimensional database may be implemented in a relation portion using a set of dimension tables that models dimensional hierarchies and a fact table that captures values. At 600, metadata corresponding to a subset of a first set of members identified by a user is retrieved, the subset of a first set of members randomly selected according to a first bias percentage indicated by a user. At 602, metadata corresponding to a subset of a second set of members identified by a user is retrieved, the subset of a second set of members randomly selected according to a second bias percentage indicated by a user. The first and second set of members identified by a user may be identified by selecting elements in a spreadsheet corresponding to the metadata. At 604, the cross product of the metadata corresponding to the subset of a first set of members and the metadata corresponding to the subset of a second set of members is determined, to arrive at an intersection of members. At 606, data corresponding to the intersection of members may be retrieved.

Figure 7:
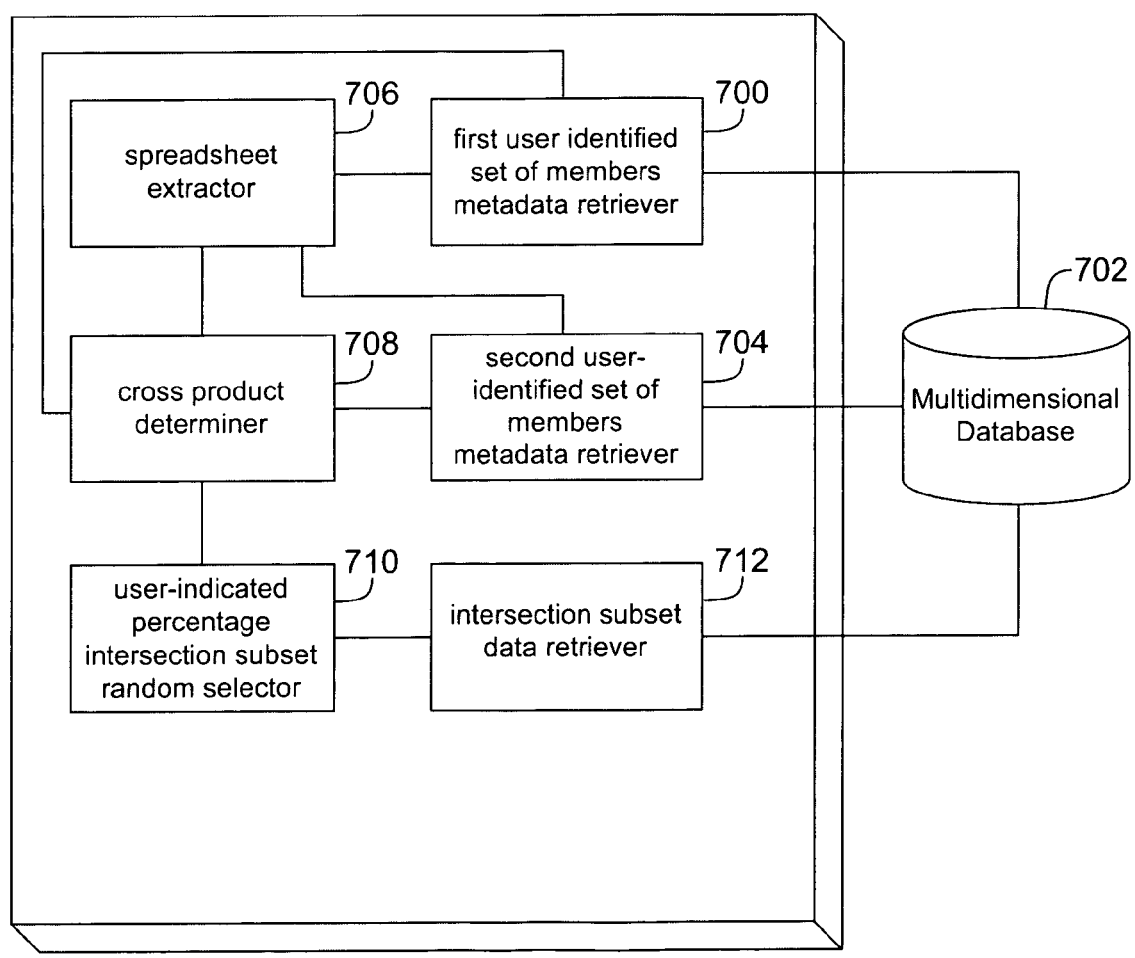
FIG. 7 is a block diagram illustrating an apparatus for sampling data in a multidimensional database, the multidimensional database having metadata and data, in accordance with a fifth embodiment of the present invention.

FIG. 7 is a block diagram illustrating an apparatus for sampling data in a multidimensional database, the multidimensional database having metadata and data, in accordance with a fifth embodiment of the present invention. The multidimensional database may be implemented in a relation portion using a set of dimension tables that models dimensional hierarchies and a fact table that captures values. A first user-identified set of members metadata retriever 700 coupled to the multidimensional database 702 may retrieve metadata corresponding to a first set of members identified by a user. A second user-identified set of members metadata retriever 704 coupled to the multidimensional database may retrieve metadata corresponding to a second set of members identified by a user. The first and second set of members identified by a user may be identified by selecting elements in a spreadsheet corresponding to the metadata using a spreadsheet extractor 706. A cross product determiner 708 coupled to the first user-identified set of members metadata retriever and to the second user-identified set of members metadata retriever may determiner the cross product of the metadata corresponding to a first set of members and the metadata corresponding to a second set of members, to arrive at an intersection of members. A user-indicated percentage intersection subset random selector 710 coupled to the cross product determiner 708 may randomly select a subset of the intersection of members according to a percentage indicated by a user. The percentage may be indicated by selecting an option in the spreadsheet. An intersection subset data retriever 712 coupled to the user indicated percentage intersection subset random selector 710 and to the multidimensional database 702 may retrieve data corresponding to the subset of the intersection of members.

Figure 8:
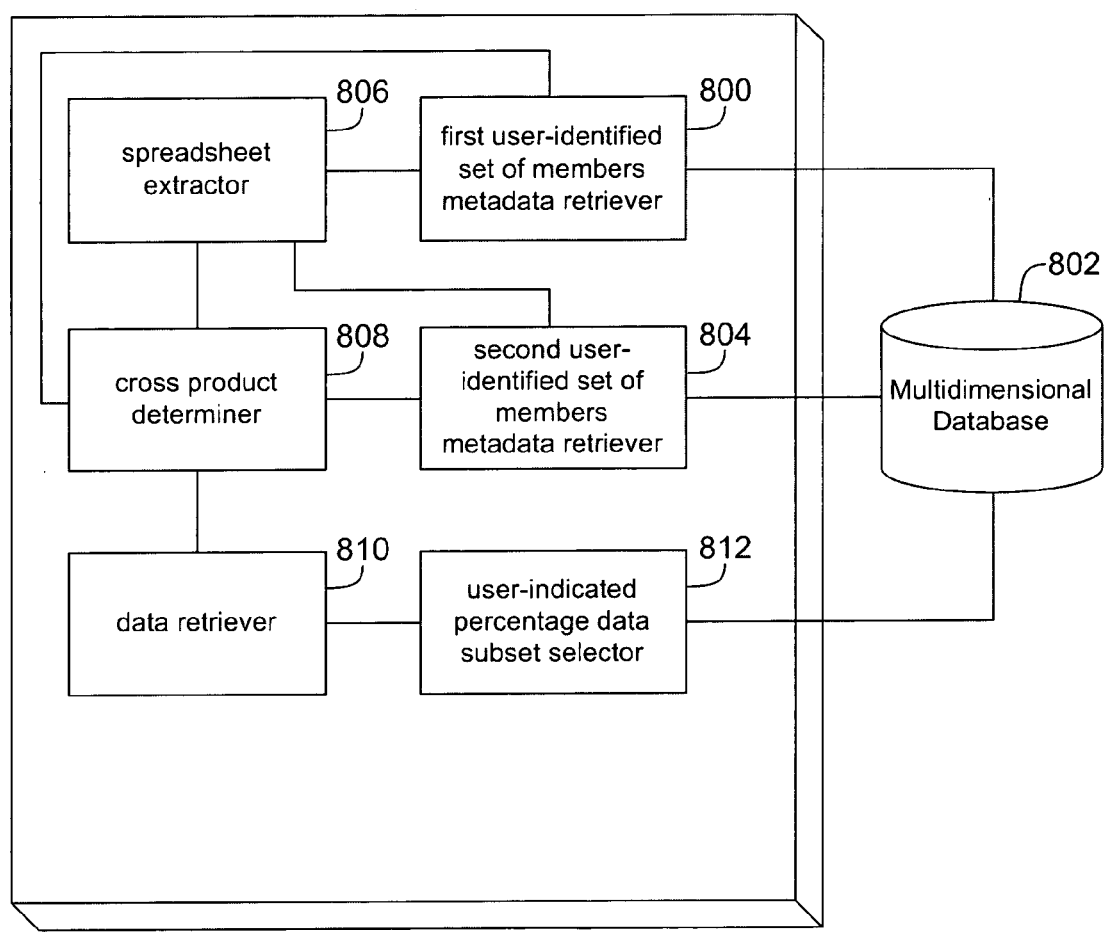
FIG. 8 is a block diagram illustrating an apparatus for sampling data in a multidimensional database, the multidimensional database having metadata and data, in accordance with a sixth embodiment of the present invention.

FIG. 8 is a block diagram illustrating an apparatus for sampling data in a multidimensional database, the multidimensional database having metadata and data, in accordance with a sixth embodiment of the present invention. The multidimensional database may be implemented in a relation portion using a set of dimension tables that models dimensional hierarchies and a fact table that captures values. A first user-identified set of members metadata retriever 800 coupled to the multidimensional database 802 may retrieve metadata corresponding to a first set of members identified by a user is retrieved. A second user-identified set of members metadata retriever 804 coupled to the multidimensional database 802 may retrieve metadata corresponding to a second set of members identified by a user. The first and second set of members identified by a user may be identified by selecting elements in a spreadsheet corresponding to the metadata using a spreadsheet extractor 806. A cross product determiner 808 coupled to the first user-identified set of members metadata retriever 800 and to the second user-identified set of members metadata retriever 804 may determine the cross product of the metadata corresponding to a first set of members and the metadata corresponding to a second set of members is determined, to arrive at an intersection of members. A data retriever 810 coupled to the cross product determiner 808 and to the multidimensional database 802 may retrieve data corresponding to the intersection of members. A user-indicated percentage data subset selector 812 coupled to the data retriever 810 may randomly select a subset of the retrieved data according to a percentage indicated by a user. The percentage may be indicated by selecting an option in the spreadsheet using the spreadsheet extractor 806. This random selection may comprise randomly selecting a subset of the retrieved data according to a percentage indicated by a user by sampling only existing cells. This helps resolve any sparsity problems.

Figure 9:
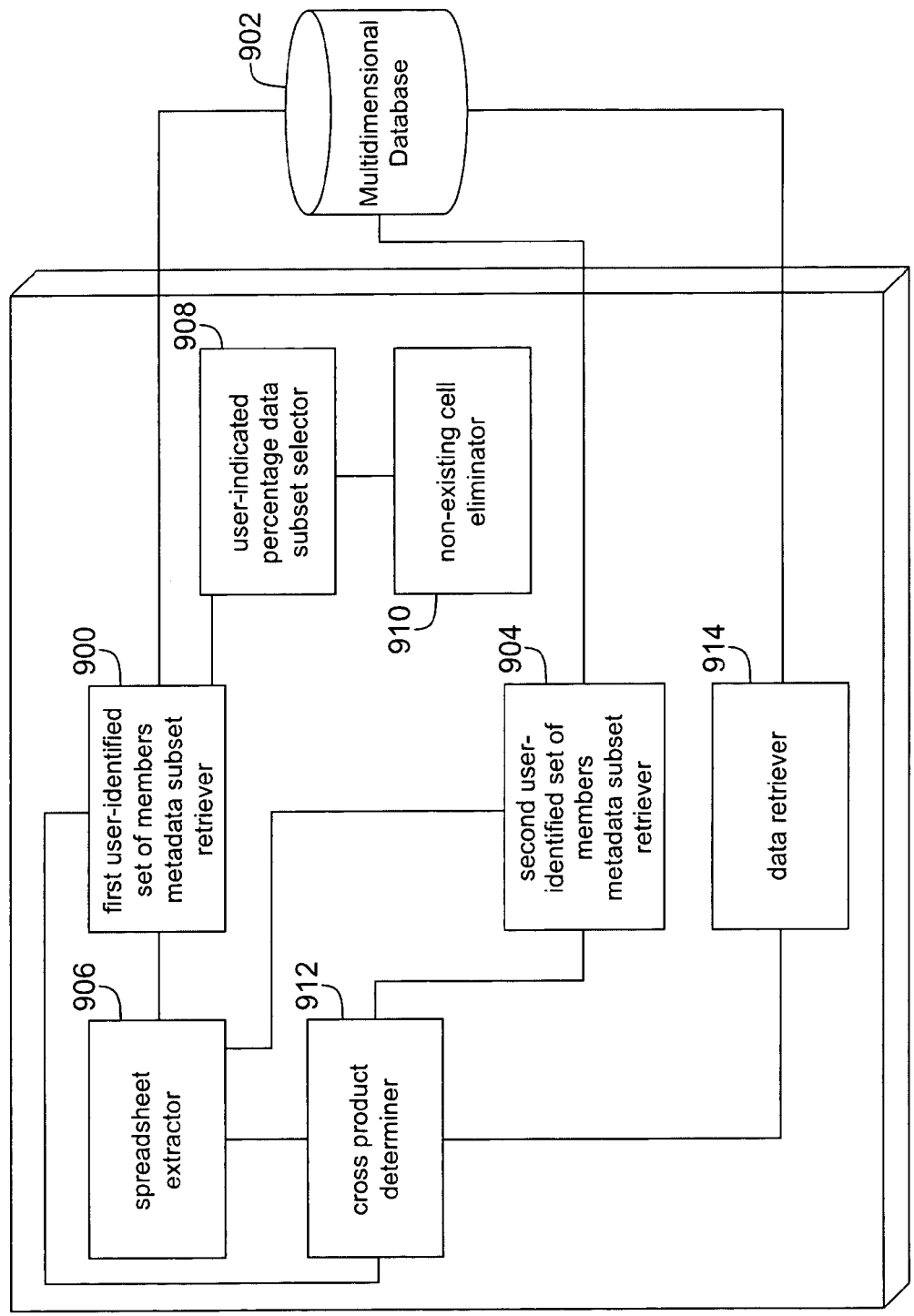
FIG. 9 is a block diagram illustrating an apparatus for sampling data in a multidimensional database, the multidimensional database having metadata and data, in accordance with a seventh embodiment of the present invention

FIG. 9 is a block diagram illustrating an apparatus for sampling data in a multidimensional database, the multidimensional database having metadata and data, in accordance with a seventh embodiment of the present invention. The multidimensional database may be implemented in a relation portion using a set of dimension tables that models dimensional hierarchies and a fact table that captures values. A first user-identified set of members metadata subset retriever 900 coupled to the multidimensional database 902 may retrieve metadata corresponding to a subset of a first set of members identified by a user, the subset of a first set of members randomly selected according to a first bias percentage and a sample size percentage indicated by a user. A second user-identified set of members metadata subset retriever 904 coupled to the multidimensional database 902 may retrieve metadata corresponding to a subset of a second set of members identified by a user, the subset of a second set of members randomly selected according to a second bias percentage and a sample size percentage indicated by a user. The first and second set of members identified by a user may be identified by selecting elements in a spreadsheet corresponding to the metadata using a spreadsheet extractor 906. The subset of a first set of members may be randomly selected in conjunction with the subset of a second set of members such that the cross product results in a number of members in the intersection of members equal to the sample size percentage of the cross product of metadata corresponding to the first set of members and metadata corresponding to the second set of members using a user-indicated percentage data subset selector 908. Additionally, a non-existing cell eliminator 910 coupled to the user-indicated percentage data subset selector 908 may eliminate any non-existing cells from the possible members to be included in the subset. A cross product determiner 912 coupled to the first user-identified set of members metadata subset retriever 900 and to the second user-identified set of members metadata subset retriever 904 may determine the cross product of the metadata corresponding to the subset of a first set of members and the metadata corresponding to the subset of a second set of members, to arrive at an intersection of members. A data retriever 914 coupled to the cross product determiner 902 and to the multidimensional database 902 may retrieve data corresponding to the intersection of members.

Figure 10:
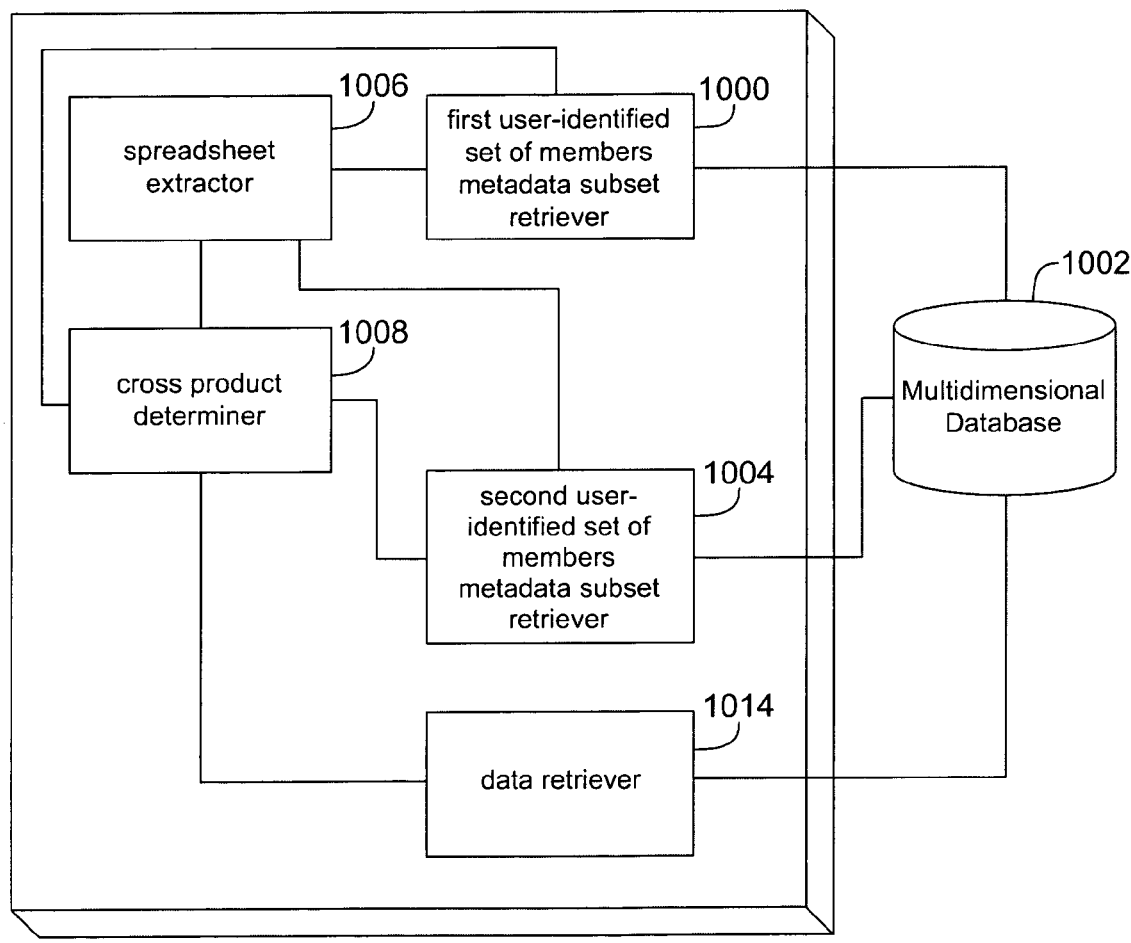
FIG. 10 is a block diagram illustrating an apparatus for sampling data in a multidimensional database, the multidimensional database having metadata and data, in accordance with an eighth embodiment of the present invention.

FIG. 10 is a block diagram illustrating an apparatus for sampling data in a multidimensional database, the multidimensional database having metadata and data, in accordance with an eighth embodiment of the present invention. The multidimensional database may be implemented in a relation portion using a set of dimension tables that models dimensional hierarchies and a fact table that captures values. A first user-identified set of members metadata subset retriever 1000 coupled to the multidimensional database 1002 may retrieve metadata corresponding to a subset of a first set of members identified by a user, the subset of a first set of members randomly selected according to a first bias percentage indicated by a user. A second user-identified set of members metadata subset retriever 1004 coupled to the multidimensional database 1002 may retrieve metadata corresponding to a subset of a second set of members identified by a user, the subset of a second set of members randomly selected according to a second bias percentage indicated by a user. The first and second set of members identified by a user may be identified by selecting elements in a spreadsheet corresponding to the metadata using a spreadsheet extractor 1006. A cross product determiner 1008 coupled to the first user-identified set of members metadata subset retriever 1000 and to the second user-identified set of members metadata subset retriever 1004 may determine the cross product of the metadata corresponding to the subset of a first set of members and the metadata corresponding to the subset of a second set of members, to arrive at an intersection of members. A data retriever 1010 coupled to the cross product determiner 1008 and to the multidimensional database 1002 may retrieve data corresponding to the intersection of members may be retrieved.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method for sampling data in a multidimensional database, the multidimensional database having metadata and data, the method comprising:
   retrieving metadata corresponding to a first set of members identified by a user;
   retrieving metadata corresponding to a second set of members identified by a user, wherein the metadata corresponding to the first set of members and the metadata corresponding to the second set of members comprises a set of dimensions, dimension members, and one or more formulas attached to said members;
   determining the cross product of said metadata corresponding to a first set of members and said metadata corresponding to a second set of members, to arrive at an intersection of members;
   randomly selecting a subset of said intersection of members according to a percentage indicated by a user; and
   retrieving data corresponding to said subset of said intersection of members.

2. The method of claim 1, wherein the multidimensional database is implemented in a relational portion using a set of dimension tables that models dimensional hierarchies and a fact table that captures cell values.

3. The method of claim 1, wherein the data is cell values.

4. The method of claim 1, wherein said first and second set of members identified by a user are identified by selecting elements in a spreadsheet corresponding to the metadata.

5. The method of claim 4, wherein said percentage is indicated by selecting an option in said spreadsheet.

6. A method for sampling data in a multidimensional database, the multidimensional database having metadata and data, the method comprising:
   retrieving metadata corresponding to a first set of members identified by a user;
   retrieving metadata corresponding to a second set of members identified by a user wherein the metadata corresponding to the first set of members and the metadata corresponding to the second set of members comprises a set of dimensions, dimension members, and one or more formulas attached to said members;
   determining the cross product of said metadata corresponding to a first set of members and said metadata corresponding to a second set of members, to arrive at an intersection of members;
   retrieving data corresponding to said intersection of members; and
   randomly selecting a subset of said retrieved data according to a percentage indicated by a user.

7. The method of claim 6, wherein the multidimensional database is implemented in a relational portion using a set of dimension tables that models dimensional hierarchies and a fact table that captures cell values.

8. The method of claim 6, wherein the data is cell values.

9. The method of claim 6, wherein said first and second set of members identified by a user are identified by selecting elements in a spreadsheet corresponding to the metadata.

10. The method of claim 9, wherein said percentage is indicated by selecting an option in said spreadsheet.

11. The method of claim 6, wherein said randomly selecting a subset of said retrieved data according to a percentage indicated by a user comprises randomly selecting a subset of said retrieved data according to a percentage indicated by a user by sampling only existing cells.

12. A method for sampling data in a multidimensional database, the multidimensional database having metadata and data, the method comprising:
   retrieving metadata corresponding to a subset of a first set of members identified by a user, said subset of a first set of members randomly selected according to a first bias percentage indicated by a user;
   retrieving metadata corresponding to a subset of a second set of members identified by a user, said subset of a second set of members randomly selected according to a second bias percentage indicated by a user wherein the metadata corresponding to the subset of the first set of members and the metadata corresponding to the subset of the second set of members comprises a set of dimensions, dimension members, and one or more formulas attached to said members;
   determining the cross product of said metadata corresponding to the subset of a first set of members and said metadata corresponding to the subset of a second set of members, to arrive at an intersection of members; and
   retrieving data corresponding to said intersection of members.

13. The method of claim 12, wherein said subset of a first set of members are randomly selected in conjunction with said subset of a second set of members such that said cross product results in a number of members in said intersection of members equal to said sample size percentage of the cross product of metadata corresponding to said first set of members and metadata corresponding to said second set of members.

14. The method of claim 12, wherein the multidimensional database is implemented in a relational portion using a set of dimension tables that models dimensional hierarchies and a fact table that captures cell values.

15. The method of claim 12, wherein the data is cell values.

16. The method of claim 12, wherein said first and second set of members identified by a user are identified by selecting elements in a spreadsheet corresponding to the metadata.

17. The method of claim 16, wherein said percentage is indicated by selecting an option in said spreadsheet.

18. The method of claim 12, wherein said retrieving metadata corresponding to a subset of a first set of members further comprises retrieving metadata corresponding to a subset of a first set of members identified by a user, said subset of a first set of members randomly selected according to a first bias percentage and a sample size percentage indicated by a user.

19. The method of claim 18, wherein said retrieving metadata corresponding to a subset of a second set of members further comprises retrieving metadata corresponding to a subset of a second set of members identified by a user, said subset of a second set of members randomly selected according to a second bias percentage indicated by a user and said sample size percentage.

20. A program storage device readable by a machine, tangibly embodying a program of instructions executable by the machine to perform a method for sampling data in a multidimensional database, the multidimensional database having metadata and data, the method comprising:
retrieving metadata corresponding to a first set of members identified by a user;
retrieving metadata corresponding to a second set of members identified by a user, wherein the metadata corresponding to the first set of members and the metadata corresponding to the second set of members comprises a set of dimensions, dimension members, and one or more formulas attached to said members;
determining the cross product of said metadata corresponding to a first set of members and said metadata corresponding to a second set of members, to arrive at an intersection of members;
randomly selecting a subset of said intersection of members according to a percentage indicated by a user; and
retrieving data corresponding to said subset of said intersection of members.

21. A program storage device readable by a machine, tangibly embodying a program of instructions executable by the machine to perform a method for sampling data in a multidimensional database, the multidimensional database having metadata and data, the method comprising:
retrieving metadata corresponding to a first set of members identified by a user;
retrieving metadata corresponding to a second set of members identified by a user, wherein the metadata corresponding to the first set of members and the metadata corresponding to the second set of members comprises a set of dimensions, dimension members, and one or more formulas attached to said members;
determining the cross product of said metadata corresponding to a first set of members and said metadata corresponding to a second set of members, to arrive at an intersection of members;
retrieving data corresponding to said intersection of members; and
randomly selecting a subset of said retrieved data according to a percentage indicated by a user.

22. A program storage device readable by a machine, tangibly embodying a program of instructions executable by the machine to perform a method for sampling data in a multidimensional database, the multidimensional database having metadata and data, the method comprising:
retrieving metadata corresponding to a subset of a first set of members identified by a user, said subset of a first set of members randomly selected according to a first bias percentage indicated by a user;
retrieving metadata corresponding to a subset of a second set of members identified by a user, said subset of a second set of members randomly selected according to a second bias percentage indicated by a user, wherein the metadata corresponding to the subset of the first set of members and the metadata corresponding to the subset of the second set of members comprises a set of dimensions, dimension members, and one or more formulas attached to said members;
determining the cross product of said metadata corresponding to the subset of a first set of members and said metadata corresponding to the subset of a second set of members, to arrive at an intersection of members; and
retrieving data corresponding to said intersection of members.

* * * * *